United States Patent
Kimura

(10) Patent No.: US 7,764,063 B2
(45) Date of Patent: Jul. 27, 2010

(54) BRUSHLESS RESOLVER AND METHOD OF CONSTRUCTING THE SAME

(75) Inventor: Satoshi Kimura, Hachinohe (JP)

(73) Assignee: Tamagawa Seiki Co., Ltd. (JP)

( * ) Notice: Subject to any disclaimer, the term of this patent is extended or adjusted under 35 U.S.C. 154(b) by 821 days.

(21) Appl. No.: 10/575,713

(22) PCT Filed: Oct. 23, 2003

(86) PCT No.: PCT/JP03/13541

§ 371 (c)(1),
(2), (4) Date: Nov. 3, 2006

(87) PCT Pub. No.: WO2005/040731

PCT Pub. Date: May 6, 2005

(65) Prior Publication Data

US 2007/0132448 A1  Jun. 14, 2007

(51) Int. Cl.
*G01B 7/30* (2006.01)
(52) U.S. Cl. ............... 324/207.18; 324/207.25
(58) Field of Classification Search ............. None
See application file for complete search history.

(56) References Cited

U.S. PATENT DOCUMENTS

| 6,239,571 B1 * | 5/2001 | Shimahara | 318/605 |
| 6,912,921 B2 * | 7/2005 | Fujiwara et al. | 73/862.328 |
| 6,958,602 B2 * | 10/2005 | Matsuura et al. | 324/207.25 |
| 2003/0230945 A1 * | 12/2003 | Okubo et al. | 310/112 |
| 2005/0273295 A1 * | 12/2005 | Ito | 702/151 |

FOREIGN PATENT DOCUMENTS

| EP | 0 446 181 A2 | 3/1991 |
| EP | 458148 A2 * | 11/1991 |
| JP | 04-220517 | 8/1992 |
| JP | 08-136211 | 5/1996 |
| JP | 2002-139348 | 5/2002 |

OTHER PUBLICATIONS

International Search Report corresponding to International Application No. PCT/JP03/13541.

* cited by examiner

*Primary Examiner*—Jay M Patidar
(74) *Attorney, Agent, or Firm*—Fay Sharpe LLP

(57) ABSTRACT

A brushless resolver (10) comprises exciting signal transmitting means for transmitting a resolver exciting signal from the stator (3) side to the rotor (4) side in a noncontact way and a resolver part (7) for modulating the resolver exciting signal according to the angle of rotation to be detected. The resolver part (7) also serves as exciting signal transmitting means. The resolver part (7) is constituted of a pair of a rotor (4) composed of a rotor iron core (43) having slots and wrapped with a rotor winding (44) and a stator (3) composed of a stator iron core (33) having slots and wrapped with a stator winding (34). The manufacturing cost can be lowered, and an arbitrary shaft multiple angle such as a shift multiple angle 1 can be set up.

19 Claims, 6 Drawing Sheets

BRUSHLESS RESOLVER AND METHOD OF CONSTRUCTING THE SAME

TECHNICAL FIELD

The present invention relates to a brush-less resolver, and more particularly, to a brush-less resolver capable of reducing cost and obtaining arbitrary axial double angle in a new structure with no transformer section.

BACKGROUND ART

A resolver, one of rotation position detectors, detects a rotation angle of a rotary machine using a phenomenon that when a coil on the excitation side is excited by an AC voltage, the phase or amplitude of an AC output voltage induced on a coil on the output side is changed depending on a rotation angle. The principle of operation is common to that of a transformer, but the resolver differs from the transformer in that the iron core of the transformer is divided into a rotor and stator. The resolver can be used even in a high-temperature, high-vibration environment and is trouble-free, further resistant to noise and widely used as a detector for equipment requiring high-level reliability.

Of resolvers, a brush-less resolver generally uses a rotary transformer instead of a conventional brush and slip ring as means for transmitting a signal to the rotor.

FIG. 7 shows a half section illustrating the structure of a conventional brush-less resolver. In the figure, the conventional brush-less resolver is mainly constructed of a detection section (hereinafter referred to as "resolver section") including a stator made up of a stator resolver iron core 131 and a stator resolver coil 132, and a rotor made up of a rotor resolver iron core 141 and a rotor resolver coil 142, a stator transformer made up of a stator transformer 151 and stator transformer coil 152, and a rotary transformer (hereinafter referred to as "transformer section") made up of a rotor transformer rotor transformer 161 and a rotor transformer coil 162.

That is, the brush-less resolver is mainly constructed of a resolver section which obtains a voltage according to a rotation angle and a transformer section whose main purpose is to transmit signals to the rotor and when this is seen from a manufacturing aspect, the conventional brush-less resolver uses a cylindrical cutting transformer for the transformer section and uses a laminated iron core subjected to lamination machining for the resolver section, and in this way different components are used for various sections to manufacture the brush-less resolver, requiring the corresponding manufacturing cost and number of steps.

Furthermore, when the brush-less resolver is seen from the functional aspect, the stator transformer, rotor transformer, rotor iron core and stator iron core constitute a magnetic circuit, the transformer section made up of the stator transformer and rotor transformer carries only the function of transmitting a resolver excitation signal from the stator side to the rotor side in a non-contact manner, and the resolver section made up of the rotor iron core and resolver iron core has the original function of the resolver, that is, modulation of a resolver excitation signal corresponding to the rotation angle. Therefore, for the conventional brush-less resolver, the transformer section does not contribute to the original function of the resolver.

As described above, the conventional brush-less resolver uses different components for the transformer section and resolver section, which results in a problem that it is difficult to reduce the manufacturing cost. Furthermore, while the transformer section contributes to the realization of a brushless structure of the resolver, the transformer section does not contribute to the modulation of a resolver excitation signal, but magnetic flux generated in the transformer section rather flows in the direction in which it is likely to interfere with the resolver section, which becomes one of causes of deterioration of the performance when seen from the aspect of the rotation angle detection performance of the resolver.

On the other hand, from the standpoint of expansion of the resolver application field, there are demands for further improvement of rotation angle detection accuracy, increase in the degree of freedom in selecting an axial double angle and increase in the degree of freedom in constructing the resolver in the brushless resolver.

In the case of a VR resolver, the rotor is constructed of only an iron core and has some effects in reductions of the number of parts and the number of pieces, but in the expansion of the degree of freedom in selecting the axial double angle, it is impossible to realize a resolver with an axial double angle 1 using the VR resolver characterized in that an angle signal corresponding to one rotation is obtained by one rotation of the resolver because the rotor has a shape eccentric with respect to the rotation center.

Based on all that described above, it is a problem to be solved by the present invention to provide a brush-less resolver capable of eliminating the problems of the above described conventional technology, allowing a cost reduction and obtaining an arbitrary axial double angle including axial double angle 1. That is, in the manufacturing aspect, it is a problem to be solved by the present invention to provide a brush-less resolver capable of reducing the number of parts and the number of pieces, reducing the cost, obtaining an arbitrary axial double angle including an axial double angle 1, increasing the degree of freedom of selecting an axial double angle, increasing the degree of freedom in an arbitrary resolver structure according to the use in the aspect of detection accuracy and reducing interference between the magnetic circuit on the excitation side and the magnetic circuit on the output side in the aspect of performance.

DISCLOSURE OF THE INVENTION

The present inventor has meticulously studied the problems described above and has come up with the present invention consequently by discovering that it is possible to solve the above described problem by adopting a new structure without providing any transformer section provided for non-contact transmission of a conventional resolver excitation signal and reviewing a coil structure, etc., of the stator and rotor. That is, as means for solving the above described problems, the invention described in the patent claims in the present application is as follows.

(1) A brush-less resolver comprising excitation signal transmitting means for transmitting a resolver excitation signal from the stator side to the rotor side in a non-contact manner and a resolver section for modulating the resolver excitation signal corresponding to the rotation angle to be detected, wherein the resolver section also serves as the excitation signal transmitting means.

(2) The brush-less resolver in (1), wherein the resolver section is constructed of a set of a rotor which has a slot and is made up of a rotor iron core provided with a coil (also referred to as "rotor coil") and a stator which has a slot and is made up of a stator iron core provided with a coil (also referred to as "stator coil").

(3) The brush-less resolver in (2), wherein the stator coil comprises a stator excitation coil section which is a coil excited by an AC voltage for transmitting a resolver excitation signal to the rotor and a stator output coil section which is a coil for outputting a signal corresponding to the rotation to be detected and appearing on the rotor, the stator excitation coil section and the stator output coil section are provided on the same single stator iron core, the rotor coil constitutes a rotor excitation coil which is a coil to receive a resolver excitation signal transmitted from the stator excitation coil section and a rotor output coil which is a coil to generate an output signal to the stator output coil section, and the rotor excitation coil and the rotor output coil are provided on the same single rotor iron core.

(4) The brush-less resolver in (2) or (3), wherein at least one of the rotor shaft or case is omitted.

(5) The brush-less resolver in (3) or (4), wherein the stator comprises a stator excitation coil section which is a coil excited by an AC voltage for transmitting a resolver excitation signal to the rotor and a stator output coil section which is a coil for outputting a signal corresponding to the rotation angle to be detected and appearing on the rotor, at least one of the stator excitation coil section or the stator output coil section is provided with coils with two phases; one having a sine-wave distribution and the other having a phase shifted by 90° (hereinafter referred to as "phases differing 90° from each other" or "phases differing from each other") and the rotor comprises a rotor coil section including a rotor excitation coil which is a coil to receive a resolver excitation signal transmitted from the stator excitation coil section and a rotor output coil which is a coil to generate an output signal to the stator output coil section and the rotor excitation coil and the rotor output coil are coils with phases differing 90° from each other.

(6) The brush-less resolver in (5), wherein both the stator excitation coil section and the stator output coil section are provided with coils with two phases differing 90° from each other and it is possible to select from among three types of signal processing system; 2-phase excitation 2-phase output, 1-phase excitation 2-phase output or 2-phase excitation 1-phase output by selecting a phase with which an excitation voltage is applied and a phase with which an output signal is extracted.

(7) The brush-less resolver in any one of (3) to (6), wherein it is possible to obtain an angle signal with the number of revolutions N times one rotation of the resolver (N is an integer equal to or greater than 1 and an arbitrary number) by arbitrarily setting at least any one of combinations of the number of slots of any one of the stator iron core or the rotor iron core, the number of pole pairs in an excitation function block made up of the stator excitation coil section and the rotor excitation coil and the number of pole pairs in an output function block made up of the stator output coil section and the rotor output coil.

(8) The brush-less resolver in any one of (5) to (7), wherein the relationship between the number of pole pairs m in the excitation function block and number of pole pairs n in the output function block is m−n=1 (where both m and n are positive integers and arbitrary numbers), opposite phases in phase rotation are set in the wiring between the rotor excitation coil and the rotor output coil in the rotor, thereby constructing a resolver with an axial double angle 1 capable of obtaining an angle signal corresponding to one rotation by one rotation of the resolver.

(9) The brush-less resolver in any one of (5) to (7), wherein the relationship between the number of pole pairs m in the excitation function block and number of pole pairs n in the output function block is n−m=1 (where both m and n are positive integers and arbitrary numbers), opposite phases in phase rotation are set in the wiring between the rotor excitation coil and the rotor output coil in the rotor, thereby constructing a resolver with an axial double angle 1 capable of obtaining an angle signal corresponding to one rotation by one rotation of the resolver in the opposite rotation direction.

(10) The brush-less resolver in any one of (5) to (7), wherein in order to prevent interference of magnetic flux between a resolver excitation signal in the excitation function block and an output signal in the output function block, the number of pole pairs m in the excitation function block is made different from the number of pole pairs n in the output function block (where, both m and n are positive integers and arbitrary numbers).

(11) A method of constructing the brush-less resolver in any one of (5) to (7), comprising a step of arbitrarily setting at least any one of combinations of the number of slots of at least one of the stator iron core or the rotor iron core, the number of pole pairs in the excitation function block and the number of pole pairs in the output function block so as to construct a brush-less resolver capable of obtaining an angle signal with the number of revolutions N times one rotation of the resolver (where N is an integer equal to or greater than 1 and an arbitrary number).

(12) The method of constructing the brush-less resolver in any one of (5) to (7), wherein the number of pole pairs m in the excitation function block is made different from the number of pole pairs n in the output function block (where, both m and n are positive integers and arbitrary numbers) so as to prevent interference between an excitation signal and an output signal.

(13) The method of constructing the brush-less resolver in (12), wherein pole pairs are arranged so that the difference between the number of pole pairs m in the excitation function block and the number of pole pairs n in the output function block becomes 1 to thereby obtain an angle signal corresponding to one rotation by one rotation of the resolver, and when a resolver having an axial double angle 1 in the same rotation direction is obtained, the poles are constructed so that the relationship between m and n becomes m−n=1, whereas when a resolver which generates an angle signal whose rotation direction is opposite and whose amount of rotation corresponds to one rotation is obtained, the poles are arranged so that the relationship between m and n becomes n−m=1 and opposite phases in phase rotation are set in the wiring between the rotor excitation coil and the rotor output coil in the rotor (where both m and n are positive integers and arbitrary numbers).

(14) A brush-less resolver rotor, the rotor comprising an iron core having a slot provided with 2-phase coils, wherein the 2-phase coils are coils having phases differing 90° from each other for modulating a resolver signal.

(15) A coil structure for a brush-less resolver, the brush-less resolver having a resolver section comprising a stator excitation coil section made up of 2-phase coils, a stator provided with a coil which constitutes a stator output coil section and a rotor provided with coils having a total of two phases of a rotor excitation coil and rotor output coil, wherein when the number of pole pairs in the excitation function block made up of the stator excitation coil section and the rotor excitation coil is m, (A) when an excitation voltage is applied to both of the two phases in the stator excitation coil section, two signals $E_3$ and $E_4$ expressed by:

[Expression]

$$E_3 = K_1 E \sin(\omega t + m\theta), E_4 = K_1 E \cos(\omega t + m\theta)$$

are obtained for the coils of the rotor, (B) when an excitation voltage is applied to only one phase in the stator excitation coil section, two signals $E_3$ and $E_4$ expressed by:

[Expression]

$$E_3 = K_1 E \cos(m\theta), E_4 = K_1 E_1 \sin(m\theta)$$

are obtained for the coils of the rotor, (where, suppose $K_1$ is a transformer ratio, E is an input signal, $E_1$ is an excitation signal, $\omega$ is an angular velocity, t is a time and $\theta$ is a rotation angle).

(16) The coil structure for a brush-less resolver in (15), wherein excitation signals $E_1$, $E_2$ and output signals $E_5$, $E_6$ of the brush-less resolver are expressed by, (I) when the signal processing system is 2-phase excitation 2-phase output

[Expression]

$$E_1 = E \sin \omega t \quad <1>$$

$$E_2 = E \cos \omega t \quad <2>$$

$$E_5 = KE \sin \{\omega t + (m+n)\theta\} \quad <5>$$

$$E_6 = KE \cos \{\omega t + (m+n)\theta\} \quad <6>$$

where when the wiring between the input and output coils in the rotor is changed and the phase rotation is changed, the output signals are expressed by,

[Expression]

$$E_5 = KE \sin \{\omega t + (m-n)\theta\} \quad <7>$$

$$E_6 = KE \cos \{\omega t + (m-n)\theta\} \quad <8>$$

(II) when the signal processing system is a 1-phase excitation 2-phase output, the output signals are expressed by,

[Expression]

$$E_1 = E \sin \omega t \quad <1>$$

$$E_5 = KE_1 \cos \{(m+n)\theta\} \quad <11>$$

$$E_6 = KE_1 \sin \{(m+n)\theta\} \quad <12>$$

where when the wiring between the input and output coils in the rotor is changed and the phase rotation is changed, the output signals are expressed by,

[Expression]

$$E_5 = KE_1 \cos \{(m-n)\theta\} \quad <13>$$

$$E_6 = KE_1 \sin \{(m-n)\theta\} \quad <14>$$

(III) when the signal processing system is a 2-phase excitation 1-phase output, the output signals are expressed by,

[Expression]

$$E_1 = E \sin \omega t \quad <1>$$

$$E_2 = E \cos \omega t \quad <2>$$

$$E_5 = KE \sin \{\omega t + (m+n)\theta\} \quad <17>$$

where when the wiring between the input and output coils in the rotor is changed and the phase rotation is changed, the output signals are expressed by,

[Expression]

$$E_5 = KE \sin \{\omega t + (m-n)\theta\} \quad <18>$$

(where, suppose K is a transformer ratio, E is an input signal, $\omega$ is an angular velocity, t is a time, $\theta$ is a rotation angle, m is the number of pole pairs in the excitation function block and n is the number of pole pairs in the output function block).

That is, in order to solve the problem with a cost reduction, the present invention provides means for not providing the transformer section which is provided for non-contact transmission of a conventional resolver excitation signal, adopting new structures as the coil structures of the stator and rotor to obtain an arbitrary axial double angle including the axial double angle 1 and adopting new structures as the coil structures of the stator and rotor to reduce interference between the magnetic circuit on the excitation side and the magnetic circuit on the output side.

That is, the present invention realizes a cost reduction by not using the rotary transformer in the brush-less resolver and constructing the resolver using a combination of the rotor iron core having a slot and the stator iron core. Furthermore, the present invention provides each iron core with 2-phase coils having phases differing 90° from each other and changes the combination of the rotation angles of the excitation coil and output coil, the numbers of slots of the rotor iron core and stator iron core, and can thereby obtain an arbitrary axial double angle including the axial double angle 1. Since the axial double angle is determined by the number of slots and coil structure, the shape of the rotor iron core is not limited by the axial double angle and it is possible to construct a resolver with the axial double angle 1 without constructing the rotor iron core in a disadvantageous shape such as eccentricity which cannot be adopted from the standpoint of the structure of the resolver.

BRIEF DESCRIPTION OF THE DRAWINGS

FIG. 2(a) is a connection diagram showing structures of the stator 3 and rotor 4 and FIG. 2(b) is a connection diagram divided into blocks of the excitation function and output function as the resolver;

FIG. 3(a) is a connection diagram showing structures of the stator and rotor and FIG. 3(b) is a connection diagram divided into blocks of the excitation function and output function as the resolver;

FIG. 4(a) is a connection diagram showing structures of the stator and rotor and FIG. 4(b) is a connection diagram divided into blocks of the excitation function and output function as the resolver;

FIG. 5(a) is a connection diagram showing structures of the stator and rotor and FIG. 5(b) is a connection diagram divided into blocks of the excitation function and output function as the resolver;

The following are descriptions of symbols used:

1 . . . Shaft, 2 . . . Case, 3 . . . Stator, 4 . . . Rotor, 8 . . . Lead wire, 10 . . . Brush-less resolver, 33 . . . Stator iron core, 34 . . . Stator coil, 43 . . . Rotor iron core, 44 . . . Rotor coil, 341 . . . Stator excitation coil section, 342 . . . Stator output coil section, 441 . . . Rotor excitation coil, 442 . . . Rotor output coil, 3411, 3412, 3425, 3426 . . . Stator coil, BR . . . Excitation function block, BS . . . Output function block, $E_1$, $E_2$ . . . Excitation voltage, $E_5$, $E_6$ . . . Output voltage

BEST MODE FOR CARRYING OUT THE INVENTION

Figure 7:
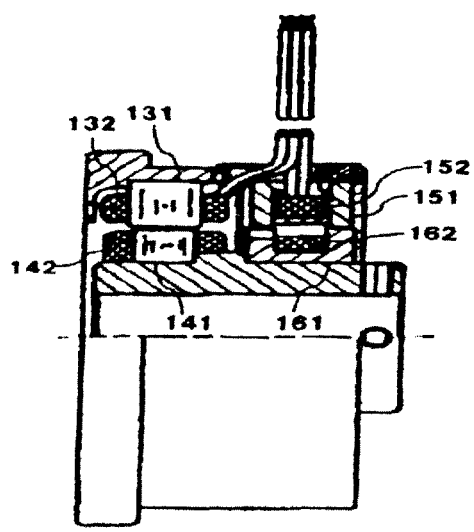
FIG. 7 is a half section of a conventional brush-less resolver.

With reference now to the attached drawings, embodiments of the present invention will be explained in detail below. Components having the same functions will be explained with the same reference numerals assigned including FIG. 7 related to the above described conventional art.

Figure 1:
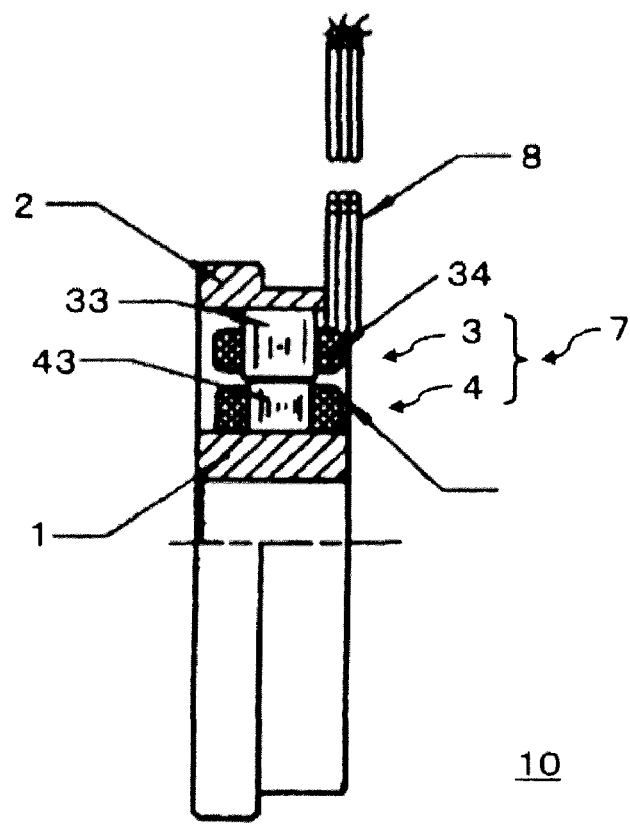
FIG. 1 is a half section showing a structure of brush-less resolver according to the present invention.

FIG. 1 is a half section showing a structure of brush-less resolver according to the present invention. In the figure, a brush-less resolver 10 of the present invention is mainly constructed of excitation signal transmitting means for transmitting a resolver excitation signal from a stator 3 side to a rotor 4 side in a non-contact manner and a resolver section 7 for modulating the resolver excitation signal corresponding to the rotation angle, with the resolver section 7 also serving as the excitation signal transmitting means. The resolver section 7 can be constructed of a set of a rotor 4 which has a slot and is made up of a rotor iron core 43 provided with a coil (hereinafter referred to as "rotor coil") 44 and a stator 3 which has a slot and is made up of a stator iron core 33 provided with a coil (hereinafter referred to as "stator coil") 34.

That is, the brush-less resolver of the present invention is not provided with any transformer section for non-contact transmission of a resolver excitation signal and is mainly constructed of only the resolver section 7 for modulating a resolver excitation signal corresponding to the rotation angle.

In the figure, the stator coil 34 is constructed of a stator excitation coil section 341 (not shown, see FIG. 2) which is a coil excited by an AC voltage for transmitting a resolver excitation signal to the rotor 4 and a stator output coil section 342 (not shown, see FIG. 2) which is a coil for outputting a signal appearing on the rotor 4 corresponding to the rotation to be detected and the stator excitation coil section 341 and the stator output coil section 342 can be provided on the same single stator iron core 33. On the other hand, the rotor coil 44 is constructed of a rotor excitation coil 441 (not shown, see FIG. 2) which is a coil for receiving a resolver excitation signal transmitted from the stator excitation coil section 341 and a rotor output coil 442 (not shown, see FIG. 2) which is a coil for generating an output signal to the stator output coil section 342, and the rotor excitation coil 441 and the rotor output coil 442 can also be provided on the same rotor iron core 43. Both the stator iron core 33 and the rotor iron core 43 can be manufactured by presswork.

In the figure, the brush-less resolver of the present invention has a basic structure including the stator 3 made up of the stator iron core 33 and stator coil 34, further including the rotor 4 made up of the rotor iron core 43 and rotor coil 44 with the stator 3 and the rotor 4 constituting the resolver section 7 for modulating the resolver excitation signal corresponding to the rotation angle to be detected, and further including a rotor shaft 1 on which the rotor 4 is provided, a lead wire 8 connected to the stator coil 34 and a case 2 for housing the stator 3 and the rotor 4.

However, the present invention can also adopt a structure without providing at least one of the rotor shaft 1 or the case 2. That is, as long as the above described resolver structure is adopted, the brush-less resolver of the present invention can be constructed without providing the rotor shaft 1 or without housing the resolver section in the case 2 or with none of the rotor shaft 1 and the case 2.

In FIG. 1, the brush-less resolver of the present invention is constructed as described above, and therefore non-contact transmission of a resolver excitation signal from the stator 3 side to the rotor 4 side is carried out not by the rotary transformer but by the resolver section 7 and modulation of the resolver excitation signal corresponding to the rotation angle to be detected is also carried out by the resolver section 7. The resolver section 7 can be constructed of a set of the rotor 4 which has a slot and is made up of the rotor iron core 43 provided with the stator coil 44 and the stator 3 which has a slot and is made up of the stator iron core 33 provided with the rotor coil 34, and can thereby simplify the resolver structure and reduce the manufacturing cost.

In the figure, the stator excitation coil section 341 (not shown, see FIG. 2) which constitutes the stator coil 34 is excited by an AC voltage and a resolver excitation signal is transmitted to the rotor 4. Furthermore, a signal appearing on the rotor 4 corresponding to the rotation angle to be detected is output to the stator output coil section 342 (not shown, see FIG. 2) which also constitutes the stator coil 34.

That is, an AC voltage is applied to the stator excitation coil section 341 (not shown, see FIG. 2), magnetic flux thereby produced excites a voltage and produces a current on the rotor excitation coil 441 (not shown, see FIG. 2) which will be described later and which constitutes a magnetic circuit and the rotor output coil 442 (not shown, see FIG. 2) which will be described later and which constitutes a circuit therewith produces and outputs magnetic flux, which causes a voltage corresponding to the rotation angle to be detected to be output to the stator output coil 341 (not shown, see FIG. 2) which constitutes a magnetic circuit therewith and causes an electric signal to be generated.

Since the stator excitation coil section 341 and the stator output coil section 342 can be provided on the same single stator iron core 33, it is possible to reduce the number of parts to a minimum level in the manufacturing steps and reduce the manufacturing cost.

On the other hand, the rotor excitation coil 441 (not shown, see FIG. 2) which constitutes the rotor coil 44 receives a resolver excitation signal transmitted from the stator excitation coil section 341. Furthermore, the rotor output coil 442 (not shown, see FIG. 2) which also constitutes the rotor coil 44 generates an output signal at the stator output coil section 342.

That is, an AC voltage is applied to the stator excitation coil section 341 (not shown, see FIG. 2) and magnetic flux thereby generated excites a voltage and produces a current on the rotor excitation coil 441 (not shown, see FIG. 2) which constitutes a magnetic circuit and the rotor output coil 442 (not shown, see FIG. 2) which constitutes a circuit therewith generates and outputs magnetic flux, which causes a voltage corresponding to the rotation angle to be detected to be output to the stator output coil 341 (not shown, see FIG. 2) which constitutes a magnetic circuit therewith and causes an electric signal to be generated.

The rotor excitation coil 441 and the rotor output coil 442 can be provided on the same single stator iron core 43, and therefore it is possible to reduce the number of parts to a minimum level in the manufacturing steps and reduce the manufacturing cost.

In the figure, the brush-less resolver of the present invention is not provided with at least one of the rotor shaft 1 or the case 2, that is, as long as the above described resolver structure is adopted, the brush-less resolver of the present invention can be constructed without providing the rotor shaft 1 or without housing the resolver section in the case 2 or with none of the rotor shaft 1 and the case 2, and can thereby reduce the number of parts, the number of pieces and reduce the manufacturing cost.

In FIG. 1, the brush-less resolver has a structure without any transformer section, and therefore interference of the magnetic circuit from the transformer section to the resolver section, which has been the problem of the conventional brush-less resolver is eliminated and the resolver performance is stabilized.

Figure 2:
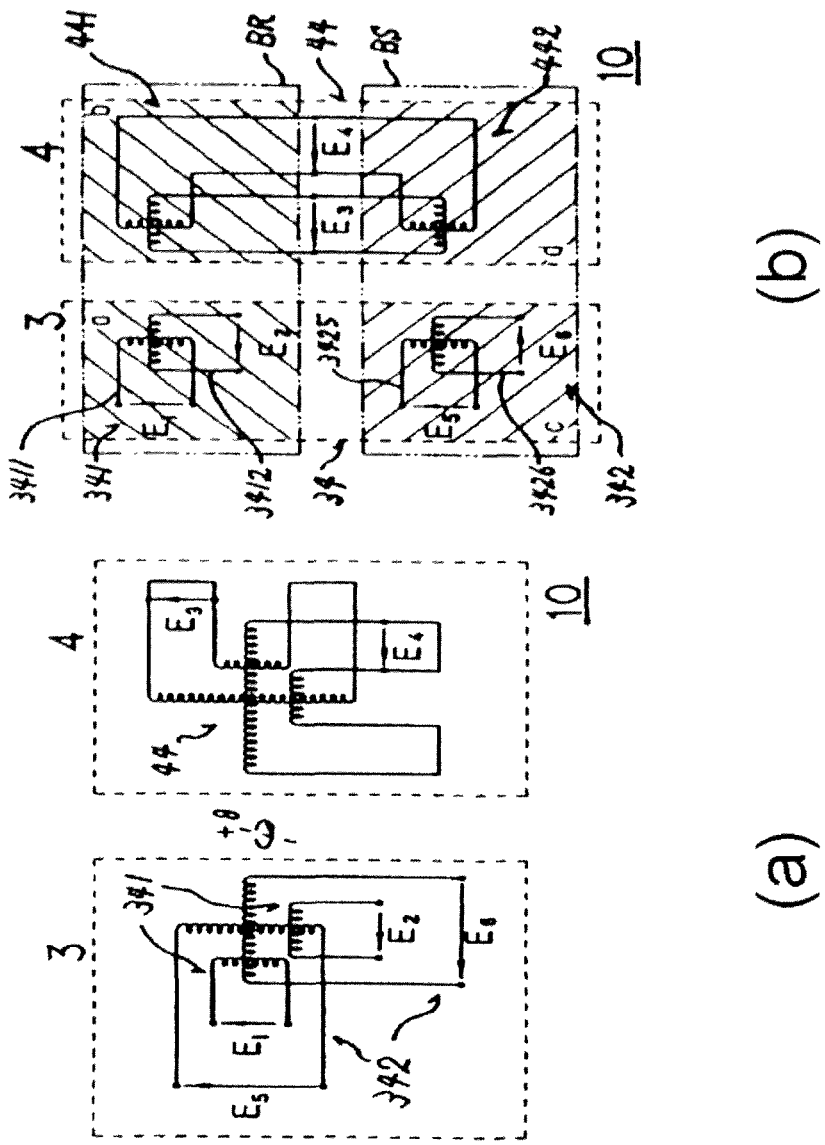
FIG. 2 is a circuit diagram showing a structure of a brush-less resolver 10 of the present invention.

FIG. 2 is a circuit diagram showing a structure of the brush-less resolver 10 of the present invention, FIG. 2(*a*) is a connection diagram showing structures of the stator 3 and rotor 4 and FIG. 2(*b*) is a connection diagram divided into blocks of the excitation function and output function as the resolver. FIG. 2 also shows the structure of the 2-phase excitation 2-phase output resolver which will be described later, but the present invention will be explained here as the brush-less resolver having a basic structure also capable of selecting a 1-phase excitation 2-phase output or 2-phase excitation 1-phase output signal processing system by adequately selecting the excitation side and output side.

In the brush-less resolver 10 of the present invention in FIG. 2, the stator 3 is provided with a stator excitation coil section 341 which is a coil excited by an AC voltage for transmitting a resolver excitation signal to the rotor 4 and a stator output coil section 342 which outputs a signal appearing on the rotor 4 corresponding to the rotation to be detected and at least one of the stator excitation coil section 341 or the stator output coil section 342 is constructed as one having coils with two phases differing 90° from each other. According to the present invention, both the stator excitation coil section 341 and the stator output coil section 342 can be constructed as having coils with two phases differing from each other with respect to the rotation angle.

On the other hand, in the figure, the rotor 4 has a rotor coil section 44 made up of a rotor excitation coil 441 which is a coil for receiving the resolver excitation signal transmitted from the stator excitation coil section 341 and a rotor output coil 442 which is a coil for generating an output signal to the stator output coil section 342, and the rotor excitation coil 441 and the rotor output coil 442 are constructed so as to be coils having two phases differing 90° from each other.

In the figure, both the stator excitation coil section 341 and the stator output coil section 342 have coils 3411 and 3412, and 3425 and 3426 with two phases differing from each other with respect to the rotation angle and can be constructed so as to be able to select from three types of signal processing system; 2-phase excitation 2-phase output, 1-phase excitation 2-phase output or 2-phase excitation 1-phase output by selecting a phase for applying an excitation voltage and a phase for extracting an output signal.

The brush-less resolver of the present invention in the figure can be constructed so as to be able to obtain an angle signal with the number of revolutions N times with respect to one rotation of the resolver by arbitrarily setting any one of the number of slots, number of pole pairs in the excitation function block BR or the number of pole pairs in the output function block BS from a combination of the number of slots of the iron core of at least one of the stator iron core 33 or the rotor iron core 43, number of pole pairs in the excitation function block BR made up of the stator excitation coil section 341 and the rotor excitation coil 441 and number of pole pairs in the output function block BS made up of the stator output coil section 342 and the rotor output coil 442. Here, N is an integer equal to or greater than 1 (natural number) and an arbitrary number.

In FIG. 2, the brush-less resolver of the present invention is constructed as described above, and therefore the stator excitation coil section 341 of the stator 3 is excited by an AC voltage, which causes a resolver excitation signal to be transmitted to the rotor 4 and causes the stator output coil section 342 to output a signal appearing on the rotor 4 corresponding to the rotation to be detected.

That is, an AC voltage is applied to the stator excitation coil section 341, the magnetic flux thereby generated excites a voltage and produces a current on the rotor excitation coil 441 which constitutes a magnetic circuit, the rotor output coil 442 which constitutes a magnetic circuit therewith generates and outputs magnetic flux, which causes a voltage corresponding to the rotation angle to be detected to be output to the stator output coil 341 which constitutes a magnetic circuit therewith and causes an electric signal to be generated.

Any one of the stator excitation coil section 341 or the stator output coil section 342 has coils with two phases differing 90° from each other. According to the present invention, both the stator excitation coil section 341 and the stator output coil section 342 can have their respective coils with two phases (coils 3411 and 3412 for the stator excitation coil section 341, and coils 3425 and 3426 for the stator output coil section 342) differing 90° from each other, and can thereby obtain excitation voltages with two different phases and output voltages with two different phases.

On the other hand, in the rotor 4 in the figure, the rotor excitation coil 441 receives a resolver excitation signal transmitted from the stator excitation coil section 341 and the rotor output coil 442 generates an output signal to the stator output coil section 342.

That is, an AC voltage is applied to the stator excitation coil section 341, the magnetic flux thereby generated excites a voltage and generates a current on the rotor excitation coil 441 which constitutes a magnetic circuit, the rotor output coil 442 which constitutes a circuit therewith generates and outputs magnetic flux, which causes a voltage corresponding to the rotation angle to be detected to be output to the stator output coil 341 which constitutes a magnetic circuit therewith and causes an electric signal to be generated.

The rotor excitation coil 441 and the rotor output coil 442 can have their respective coils having two phases differing 90° from each other, and can thereby obtain voltages with two different phases.

Therefore, the stator 4 selects a phase for applying an excitation voltage and a phase for extracting an output signal, and can thereby select from among three types of signal processing system; 2-phase excitation 2-phase output, 1-phase excitation 2-phase output or 2-phase excitation 1-phase output.

Furthermore, at least one of the number of slots, number of pole pairs in the excitation function block BR or number of pole pairs in the output function block BS is arbitrarily set and an angle signal with the number of revolutions N times with respect to one rotation of the resolver is obtained. That is, the number of slots of the stator iron core 33, number of slots of the rotor iron core 43, structure of the excitation coil in the excitation function block BR and the structure of the output coil in the output function block BS are arbitrarily set, and a necessary axial double angle is set. This increases the degree of freedom in selecting the axial double angle and results in an increase in the degree of freedom of the resolver structure and design. Here, N is an integer equal to or greater than 1 (natural number) and an arbitrary number.

The brush-less resolver of the present invention in the figure has a relationship of m−n=1 between the number of pole pairs m in the excitation function block BR and number of pole pairs n in the output function block BS, that is, the number of pole pairs m in the excitation function block BR is set to be larger than the number of pole pairs n in the output function block BS by 1 and the wiring of the rotor excitation coil 441 and the wiring of the rotor output coil 442 in the rotor 4 can be set so as to have opposite phases in phase rotation and realize a resolver with axial double angle 1 capable of obtaining an angle signal corresponding to one rotation by one rotation of the resolver.

Furthermore, it is also possible to construct a resolver having a relationship of n−m=1 between the number of pole pairs m in the excitation function block BR and number of pole pairs n in the output function block BS, that is, the number of pole pairs m in the excitation function block BR is set to be smaller than the number of pole pairs n in the output function block BS by 1 and the wiring of the rotor excitation coil 441 and the wiring of rotor output coil 442 in the rotor 4 can be set so as to have opposite phases in phase rotation and realize a resolver with axial double angle 1 capable of obtaining an angle signal whose amount of rotation corresponds to one rotation by one rotation of the resolver.

In the brush-less resolver of the present invention in the figure, in order to prevent interference of magnetic flux between the resolver excitation signal in the excitation function block BR and the output signal in the output function block BS, it is possible to adopt a structure in which the number of pole pairs m in the excitation function block BR is made different from the number of pole pairs n in the output function block BS.

Next, an example of the structure of the brush-less resolver of each signal processing system will be explained based on the basic structure of the above described brush-less resolver of the present invention.

Figure 3:
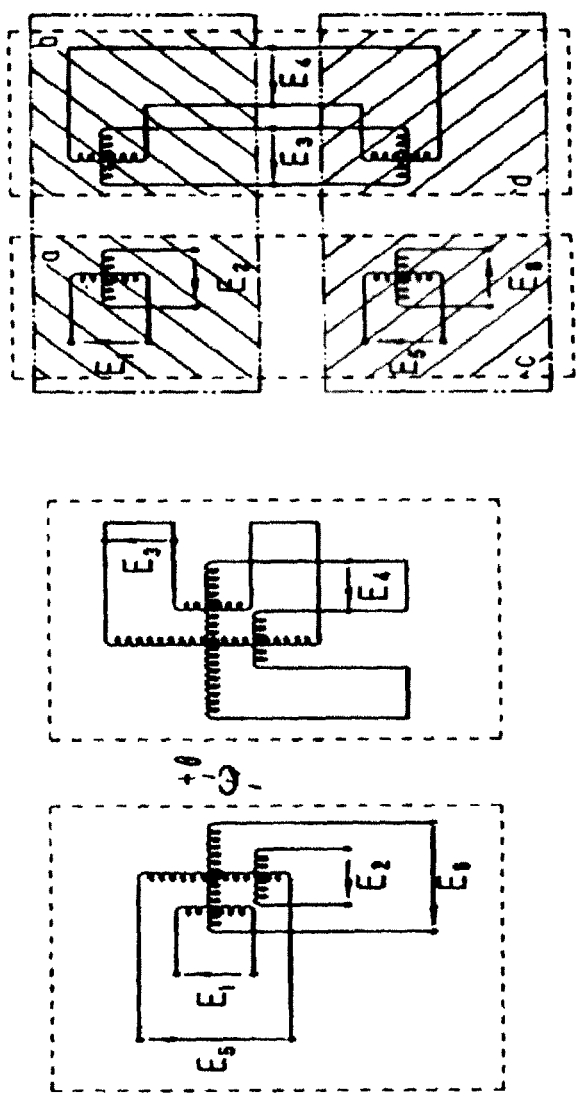
FIG. 3 is a circuit diagram showing a structure of the brush-less resolver of the present invention when a signal processing system with 2-phase excitation 2-phase output is adopted.

FIG. 3 is a circuit diagram showing a structure of the brush-less resolver of the present invention when a signal processing system with 2-phase excitation 2-phase output is adopted, FIG. 3(a) is a connection diagram showing structures of the stator and rotor and FIG. 3(b) is a connection diagram divided into blocks of the excitation function and output function as the resolver. In this structure, the stator is constructed of a stator excitation coil a (m pole pairs) and stator output coil c (n pole pairs), while the rotor is constructed of a rotor excitation coil b (m pole pairs) and rotor output coil d (n pole pairs). $E_1$, $E_2$ are excitation signals and $E_5$, $E_6$ are output signals. Their theoretical expressions are as shown in <1> to <6> of Expression 1. In the expressions, K, $K_1$, $K_2$ are transformer ratios, ω is an angular velocity (rad/s), t is a time (s) and θ is a rotation angle (rad). The same will also apply to the following expressions.

[Expression 1]

$$E_1 = E\sin\omega t \quad <1>$$

$$E_2 = E\cos\omega t \quad <2>$$

$$\begin{aligned}E_3 &= K_1 E_1 \cos(m\theta) + K_1 E_2 \sin(m\theta) \\ &= K_1 E\sin\omega t\cos(m\theta) + K_1 E\cos\omega t\sin(m\theta) \\ &= K_1 E\sin(\omega t + m\theta)\end{aligned} \quad <3>$$

$$\begin{aligned}E_4 &= -K_1 E_1 \sin(m\theta) + K_1 E_2 \cos(m\theta) \\ &= -K_1 E\sin\omega t\sin(m\theta) + K_1 E\cos\omega t\cos(m\theta) \\ &= K_1 E\cos(\omega t + m\theta)\end{aligned} \quad <4>$$

-continued $$\begin{aligned}E_5 &= K_2 E_3 \cos(n\theta) + K_2 E_4 \sin(n\theta) \\ &= K_1 K_2 E\sin(\omega t + m\theta)\cos(n\theta) + \\ &\quad K_1 K_2 E\cos(\omega t + m\theta)\sin(n\theta) \\ &= KE\sin(\omega t + m\theta + n\theta) \\ &= KE\sin\{\omega t + (m+n)\theta\}\end{aligned} \quad <5>$$

$$\begin{aligned}E_6 &= -K_2 E_3 \sin(n\theta) + K_2 E_4 \cos(n\theta) \\ &= -K_1 K_2 E\sin(\omega t + m\theta)\sin(n\theta) + \\ &\quad K_1 K_2 E\cos(\omega t + m\theta)\cos(n\theta) \\ &= KE\cos(\omega t + m\theta + n\theta) \\ &= KE\cos\{\omega t + (m+n)\theta\}\end{aligned} \quad <6>$$

That is, according to the signal processing system with 2-phase excitation 2-phase output, the output signals $E_5$ and $E_6$ obtained are signals whose phases are shifted by (m+n)θ from the phases of the excitation signals $E_1$ and $E_2$.

Here, if the wiring between the input and output coils in the rotor is changed and the phase rotation is changed, the theoretical expressions can be expressed by <7>, <8> of Expression 2.

[Expression 2]

$$\begin{aligned}E_5 &= K_2 E_3 \cos(n\theta) - K_2 E_4 \sin(n\theta) \\ &= KE\sin\{\omega t + (m-n)\theta\}\end{aligned} \quad <7>$$

$$\begin{aligned}E_6 &= K_2 E_3 \sin(n\theta) + K_2 E_4 \cos(n\theta) \\ &= KE\cos\{\omega t + (m-n)\theta\}\end{aligned} \quad <8>$$

That is, in this case, according to the signal processing system with 2-phase excitation 2-phase output, the output signals $E_5$ and $E_6$ obtained are signals whose phases are shifted by (m−n)θ from the phases of the excitation signals $E_1$ and $E_2$.

Figure 4:
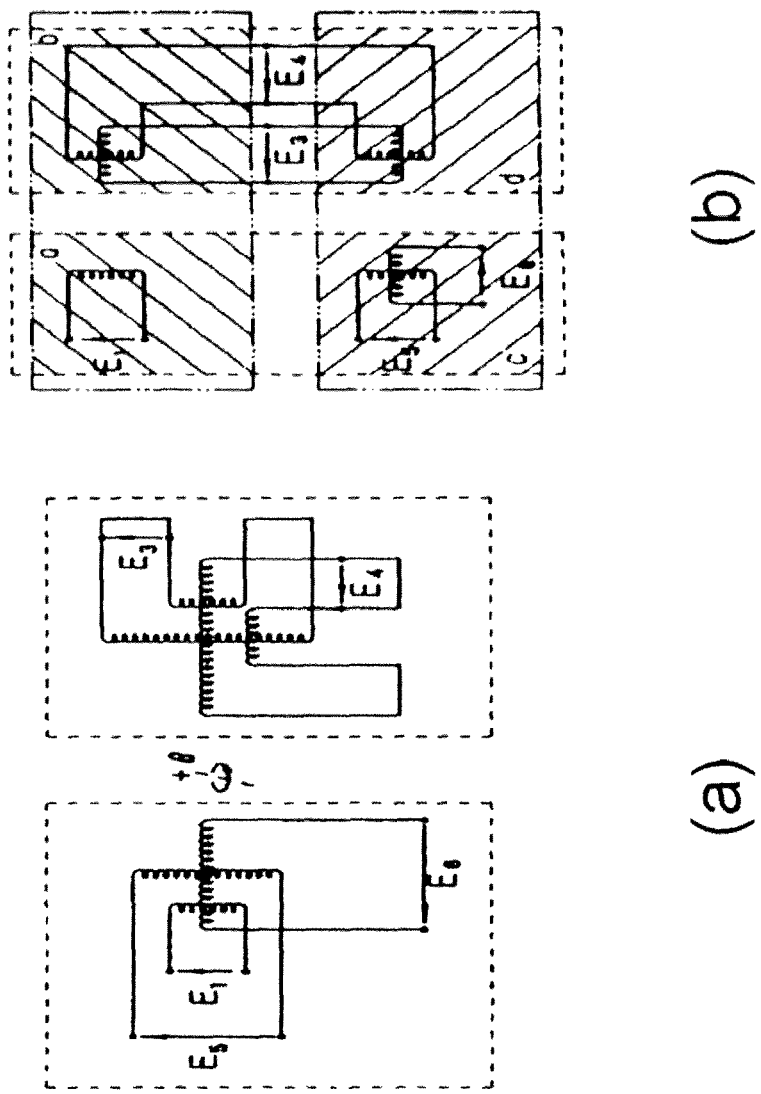
FIG. 4 is a circuit diagram showing a structure of the brush-less resolver of the present invention when a signal processing system with 1-phase excitation 2-phase output is adopted.

FIG. 4 is a circuit diagram showing a structure of the brush-less resolver of the present invention when a signal processing system with 1-phase excitation 2-phase output is adopted, FIG. 4(a) is a connection diagram showing structures of the stator and rotor and FIG. 4(b) is a connection diagram divided into blocks of the excitation function and output function as the resolver. In this structure, the stator is constructed of a stator excitation coil a (m pole pairs) and stator output coil c (n pole pairs), while the rotor is constructed of a rotor excitation coil b (m pole pairs) and rotor output coil d (n pole pairs). $E_1$ is an excitation signal and $E_5$, $E_6$ are output signals. The theoretical expressions are as shown in <11>, <12> of Expression 3.

[Expression 3]

$$E_1 = E\sin\omega t \quad <1>$$

$$E_3 = K_1 E_1 \cos(m\theta) \quad <9>$$

$$E_4 = K_1 E_1 \sin(m\theta) \quad <10>$$

$$\begin{aligned}E_5 &= K_2 E_3 \cos(n\theta) - K_2 E_4 \sin(n\theta) \\ &= K_1 K_2 E_1 \{\cos(m\theta)\cos(n\theta) - \sin(m\theta)\sin(n\theta)\} \\ &= KE_1 \cos\{(m+n)\theta\}\end{aligned} \quad <11>$$

-continued $$E_6 = K_2 E_3 \sin(n\theta) + K_2 E_4 \cos(n\theta) \qquad <12>$$
$$= K_1 K_2 E_1 \{\cos(m\theta)\sin(n\theta) + \sin(m\theta)\cos(n\theta)\}$$
$$= KE_1 \sin\{(m+n)\theta\}$$

That is, according to the signal processing system with 1-phase excitation 2-phase output, the output signals $E_5$ and $E_6$ obtained have axial double angles (m+n) times that of the excitation signal $E_1$, that is, it is possible to obtain angle signals corresponding to (m+n) rotations by one rotation.

Here, if the wiring between the input and output coils in the rotor is changed and the phase rotation is changed, the theoretical expressions are expressed by <13>, <14> of Expression 4.

[Expression 4]

$$E_5 = K_2 E_3 \cos(n\theta) + K_2 E_4 \sin(n\theta) \qquad <13>$$
$$= KE_1 \cos\{(m-n)\theta\}$$

$$E_6 = -K_2 E_3 \sin(n\theta) + K_2 E_4 \cos(n\theta) \qquad <14>$$
$$= KE_1 \sin\{(m-n)\theta\}$$

That is, in this case, according to the signal processing system with 1-phase excitation 2-phase output, the output signals $E_5$ and $E_6$ obtained have axial double angles (m−n) times that of the excitation signal $E_1$, that is, it is possible to obtain angle signals corresponding to (m−n) rotations by one rotation.

Figure 5:
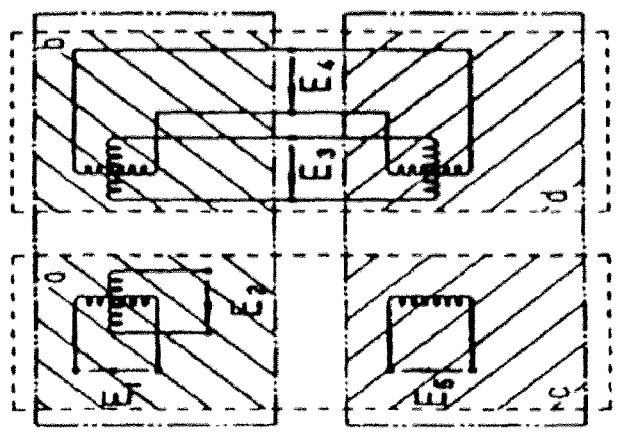
FIG. 5 is a circuit diagram showing a structure of the brush-less resolver of the present invention when a 2-phase excitation 1-phase output signal processing system is adopted.
Figure 5:
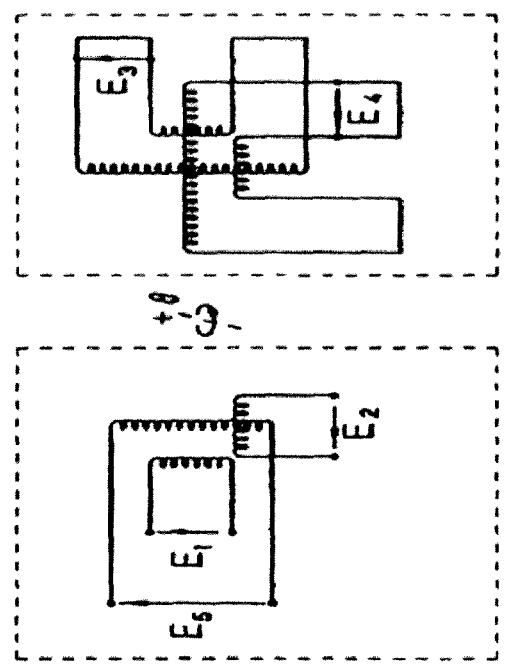

FIG. 5 is a circuit diagram showing a structure of the brush-less resolver of the present invention when a signal processing system with 2-phase excitation 1-phase output is adopted, FIG. 5(a) is a connection diagram showing structures of the stator and rotor and FIG. 5(b) is a connection diagram divided into blocks of the excitation function and output function as the resolver. In this structure, the stator is constructed of a stator excitation coil a (m pole pairs) and stator output coil c (n pole pairs), while the rotor is constructed of a rotor excitation coil b (m pole pairs) and rotor output coil d (n pole pairs). $E_1$, $E_2$ are excitation signals and $E_5$ is an output signal. The theoretical expression is as shown in <17> of Expression 5.

[Expression 5]

$$E_1 = E\sin\omega t \qquad <1>$$

$$E_2 = E\cos\omega t \qquad <2>$$

$$E_3 = K_1 E_1 \cos(m\theta) + K_1 E_2 \sin(m\theta) \qquad <15>$$
$$= K_1 E\sin\omega t\cos(m\theta) + K_1 E\cos\omega t\sin(m\theta)$$
$$= K_1 E\sin(\omega t + m\theta)$$

$$E_4 = -K_1 E_1 \sin(m\theta) + K_1 E_2 \cos(m\theta) \qquad <16>$$
$$= -K_1 E\sin\omega t\sin(m\theta) + K_1 E\cos\omega t\cos(m\theta)$$
$$= K_1 E\cos(\omega t + m\theta)$$

-continued $$E_5 = K_2 E_3 \cos(n\theta) + K_2 E_4 \sin(n\theta) \qquad <17>$$
$$= K_1 K_2 E\sin(\omega t + m\theta)\cos(n\theta) +$$
$$\quad K_1 K_2 E\cos(\omega t + m\theta)\sin(n\theta)$$
$$= KE\sin(\omega t + m\theta + n\theta)$$
$$= KE\sin\{\omega t + (m+n)\theta\}$$

That is, according to the signal processing system with 2-phase excitation 1-phase output, the output signal $E_5$ obtained is a signal whose phase is shifted by (m+n)θ from the phases of the excitation signals $E_1$, $E_2$.

Here, if the wiring between the input and output coils in the rotor is changed and the phase rotation is changed, the theoretical expression is expressed by <18> of Expression 6.

[Expression 6]

$$E_5 = K_2 E_3 \cos(n\theta) - K_2 E_4 \sin(n\theta) \qquad <18>$$
$$= KE\sin\{\omega t + (m-n)\theta\}$$

That is, in this case, according to the signal processing system with 2-phase excitation 1-phase output, the output signal $E_5$ obtained is a signal whose phase is shifted by (m−n)θ from the phases of the excitation signals $E_1$, $E_2$.

As described above, the brush-less resolver of the present invention can constitute a resolver according to various signal processing systems with 2-phase excitation 2-phase output, 1-phase excitation 2-phase output and 2-phase excitation 1-phase output, arbitrarily arrange their respective phase shifts, select a combination of the numbers of pole pairs m and n on the excitation side and output side, and thereby obtain angle signals N times (axial double angle N) with respect to the rotation angle θ. Furthermore, according to the number of slots of the iron core and a combination of m and n, it is possible to obtain a required N-time signal.

Furthermore, the brush-less resolver of the present invention can prevent interference between the excitation signal and output signal when the stator and rotor use the same iron core by making the number of pole pairs m in the excitation function block different from the number of pole pairs n in the output function block. Here, both m and n are positive integers and arbitrary numbers. The same will also apply below.

Furthermore, the brush-less resolver of the present invention constructs the poles in such a way that the difference between the number of pole pairs m in the excitation function block and number of pole pairs n in the output function block becomes 1 so as to obtain an angle signal corresponding to one rotation by one rotation of the resolver. To obtain a resolver with the axial double angle 1 with the same rotation direction, the poles are constructed so that the relationship between the number of pole pairs m and n becomes m−n=1 in each block. On the other hand, to obtain a resolver whose rotation direction is opposite and which generates an angle signal whose amount of rotation corresponds to one rotation, the poles are constructed so that the relationship between m and n becomes n−m=1 and the phases become opposite in phase rotation in the wiring between the rotor excitation coil and rotor output coil in the rotor.

The rotor in the brush-less resolver of the present invention is made up of the iron cores having slots provided with coils having two phases as shown above and the coils with two phases are constructed so as to have phases differing 90° from each other for modulating a resolver signal, which allows the above described brush-less resolver of the present invention to perform various types of signal modulation.

That is, the brush-less resolver of the present invention has a resolver section including a stator excitation coil section made up of coils with two phases, a stator provided with a coil constituting a stator output coil section, a rotor provided with coils having a total of two phases of the rotor excitation coil and rotor output coil. When the number of pole pairs in the excitation function block made up of the stator excitation coil and the rotor excitation coil is m, the following signal is generated in the rotor.

(A) When an excitation voltage is applied to both of two phases of the stator excitation coil section, the rotor coil can obtain two signal $E_3$, $E_4$ expressed by:
[Expression]
$$E_3 = K_1 E \sin(\omega t + m\theta), E_4 = K_1 E \cos(\omega t + m\theta)$$

(B) When an excitation voltage is applied to only one phase of the stator excitation coil section, the rotor coil can obtain two signal $E_3$, $E_4$ expressed by:
[Expression]
$$E_3 = K_1 E \cos(m\theta), E_4 = K_1 E_1 \sin(m\theta)$$

Based on these signals, the output signal $E_5$, $E_6$ in the stator output coil section are determined. The respective reference characters denote the same as those described above; K1 denotes a transformer ratio, E and $E_1$ denote excitation signals, ω denotes an angular velocity, t denotes a time and θ denotes a rotation angle.

EMBODIMENTS

The structure of the input/output coils of the brush-less resolver of the present invention in the case of 1-phase excitation 2-phase output (see FIG. 4) will be shown below as an example. By changing the combination of m and n, an angle signal N (axial double angle N) times the rotation angle θ is obtained. The N-time signal is not limited to this example at this time, but it is possible to obtain the required N-time signal according to the number of slots of the iron core and the combination of and m and n. In the following expressions, θ is a rotation angle, m is the number of pole pairs on the excitation side and n is the number of pole pairs on the output side.

1. When the number of pole pairs on the excitation side and the output side are m=1, n=2, respectively, the output signal is as shown by Expression 7. The axial double angle becomes 3 and a brush-less resolver is constructed which can obtain an angle signal corresponding to three rotations by one rotation.

[Expression 7]
When m=1, n=2, from Expressions <11>, <12>

$$E_1 = E\sin\omega t$$

$$E_5 = KE_1\cos\{(m+n)\theta\}$$
$$= KE_1\cos\{(1+2)\theta\}$$
$$= KE_1\cos 3\theta$$

$$E_6 = KE_1\sin\{(m+n)\theta\}$$
$$= KE_1\sin\{(1+2)\theta\}$$
$$= KE_1\sin 3\theta$$

2. When the numbers of pole pairs on the excitation side and the output side are m=3, n=1, the output signals are as shown in Expression 8. The axial double angle becomes 4 and a resolver is constructed which can obtain an angle signal corresponding to four rotations by one rotation.

[Expression 8]
When m=3, n=1, from Expressions <11>, <12>

$$E_1 = E\sin\omega t$$

$$E_5 = KE_1\cos\{(m+n)\theta\}$$
$$= KE_1\cos\{(3+1)\theta\}$$
$$= KE_1\cos 4\theta$$

$$E_6 = KE_1\sin\{(m+n)\theta\}$$
$$= KE_1\sin\{(3+1)\theta\}$$
$$= KE_1\sin 4\theta$$

3. When the numbers of pole pairs on the excitation side and the output side are m=8, n=7 and when the phase rotation is opposite, the output signals are as shown in Expression 9. An axial double angle becomes 1 and a brush-less resolver is constructed which can obtain an angle signal corresponding to one rotation by one rotation.

[Expression 9]
When m=8, n=7 and when the phase rotation is opposite, from Expressions <13>, <14>, $$E_1 = E\sin\omega t$$

$$E_5 = KE_1\cos\{(m-n)\theta\}$$
$$= KE_1\cos\{(8-7)\theta\}$$
$$= KE_1\cos\theta$$

$$E_6 = KE_1\sin\{(m-n)\theta\}$$
$$= KE_1\sin\{(8-7)\theta\}$$
$$= KE_1\sin\theta$$

4. When the numbers of pole pairs on the excitation side and the output side are m=1, n=2 and when the phase rotation is opposite, the output signals are as shown in Expression 10. A brush-less resolver is constructed whose phase rotation is opposite and which can obtain an angle signal corresponding to one rotation by one rotation.

[Expression 10]
When m=1, n=2 and when the phase rotation is opposite, from Expressions <13>, <14>, $$E_1 = E\sin\omega t$$

$$E_5 = KE_1\cos\{(m-n)\theta\}$$
$$= KE_1\cos\{(1-2)\theta\}$$
$$= KE1\cos\theta$$

-continued $$E_6 = KE_1\sin\{(m-n)\theta\}$$
$$= KE_1\sin\{(1-2)\theta\}$$
$$= KE_1\sin\theta$$

Figure 6:
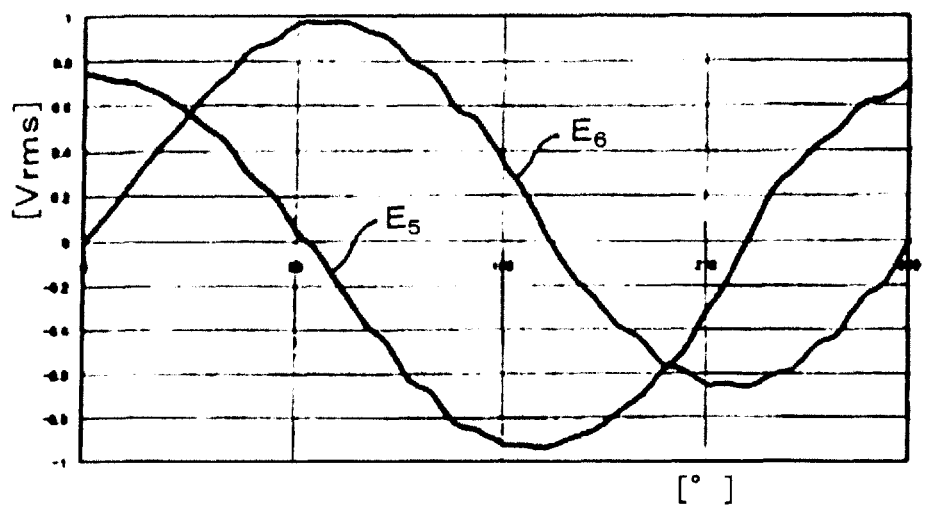
FIG. 6 is a graph showing a relationship between the axial angle measured by the brush-less resolver having the structure according to Embodiment 3 and output signal level (m=8, n=7, in the case of opposite phase rotations)

FIG. 6 is a graph showing a relationship between the axial angle measured by the brush-less resolver having the structure according to Embodiment 3 and output signal level (m=8, n=7, in the case of opposite phase rotation). The graph shows that a brush-less resolver is constructed whose axial double angle is 1 and which can obtain an angle corresponding to one rotation by one rotation. In the figure, the unit of the axial angle shown on the horizontal axis is not rad but ° (degree).

INDUSTRIAL APPLICABILITY

Being constructed as shown above, the present invention can reduce the manufacturing cost of a brush-less resolver and obtain an arbitrary axial double angle including axial double angle 1. That is, in the aspect of manufacturing, a simple structure that eliminates the need for any rotary transformer section can reduce the number of components, number of pieces and the number of manufacturing steps and reduce the manufacturing cost.

Furthermore, it is possible to obtain an arbitrary axial double angle including axial double angle 1 without taking a disadvantageous structure in the shape of the iron core such as eccentricity and adopt an arbitrary resolver structure according to the application in aspects of detection accuracy and detection resolution, etc. That is, the degree of freedom in selecting axial double angles increases and it is possible to increase the degree of freedom in the resolver structure together with versatility of available signal processing systems.

In the aspect of performance, the structure without requiring any transformer section can solve the problem of interference between the magnetic circuit on the excitation side and the magnetic circuit on the output side.

The invention claimed is:

1. A brush-less resolver comprising:
a stator having a central axis;
a rotor at least partially disposed within said stator and rotatable relative to said stator about said axis; and,
a resolver section operatively disposed between said stator and said rotor, said resolver section including:
excitation signal transmitting means for transmitting a resolver excitation signal from said stator to said rotor in a non-contact manner; and
excitation signal modulating means for modulating said resolver excitation signal corresponding to a rotation angle to be detected between said stator and said rotor.

2. The brush-less resolver according to claim 1, wherein said rotor includes a rotor iron core having a rotor coil operatively connected with said rotor iron core, and said stator includes a stator iron core and a stator coil operatively connected with said stator iron core.

3. The brush-less resolver according to claim 2, wherein said stator coil includes a stator excitation coil section and a stator output coil section, said stator excitation coil section capable of being excited by an associated AC voltage for transmitting said resolver excitation signal from said stator to said rotor, said stator output coil section outputting a signal corresponding to said rotation angle to be detected and appearing on said rotor;
said stator excitation coil section and said stator output coil section being operatively connected to said stator iron core;
said rotor coil including a rotor excitation coil and a rotor output coil, said rotor excitation coil receiving said resolver excitation signal transmitted from said stator excitation coil section, said rotor output coil generating said signal corresponding to said rotation angle and communicating said signal to said stator output coil section, and
said rotor excitation coil and said rotor output coil being operatively connected to said rotor iron core.

4. The brush-less resolver according to claim 2 further comprising at least one of a rotor shaft operatively connected to said rotor and a case operatively connected to said stator.

5. The brush-less resolver according to claim 2, wherein said stator coil includes a stator excitation coil section and a stator output coil section, said stator excitation coil section capable of being excited by an associated AC voltage for transmitting said resolver excitation signal from said stator to said rotor, said stator output coil section outputting a signal corresponding to said rotation angle to be detected and appearing on the rotor;
at least one of said stator excitation coil section and said stator output coil section including a first coil operating at a first phase having a sine-wave distribution and a second coil operating at a second phase that is shifted by 90° from said first phase; and
said rotor coil including a rotor excitation coil and a rotor output coil, said rotor excitation coil receiving said resolver excitation signal transmitted from said stator excitation coil section, said rotor output coil generating said signal corresponding to said rotation angle and communicating said signal to said stator output coil section, and
said rotor excitation coil and said rotor output coil operating at phases differing 90° from each other.

6. The brush-less resolver according to claim 5, wherein said stator excitation coil section and said rotor excitation coil form an excitation function block having a first number of pole pairs, and said stator output coil section and said rotor output coil form an output function block having a second number of pole pairs that is different from said first number of pole pairs.

7. The brush-less resolver according to claim 6, wherein an angle signal with a number of revolutions N times one rotation of said brush-less resolver is established by a relationship between at least said first number of pole pairs of said excitation function block and said second number of pole pairs of said output function block.

8. The brush-less resolver of claim 7, wherein said relationship between said first number of pole pairs in said excitation function block and said second number of pole pairs in said output function block is established by the equation m−n=1 where m represents said first number of pole pairs and n represents said second number of pole pairs, and such that a brush-less resolver with an axial double angle of one (1) is formed that is capable of obtaining an angle signal corresponding to one rotation by one rotation of said resolver in a first rotational direction.

9. The brush-less resolver of claim 7, wherein said relationship between said first number of pole pairs in said excitation function block and said second number of pole pairs in said output function block is established by the equation n−m=1 where m represents said first number of pole pairs and n represents said second number of pole pairs, and such that a brush-less resolver with an axial double angle of one (1) is formed that is capable of obtaining an angle signal corresponding to one rotation by one rotation of the resolver in a second rotation direction opposite said first rotational direction.

10. A brush-less resolver comprising:

a set of a stator and a rotor, said stator including a stator iron core and a stator coil operatively connected to said stator iron core, said rotor including a rotor iron core and a rotor coil operatively connected to said rotor iron core;

said stator coil including a stator excitation coil section and a stator output coil section that are both provided on said stator iron core, said stator excitation coil section adapted to be excited by an associated AC voltage for transmitting a resolver excitation signal to said rotor, said stator excitation coil section including a plurality of coils with a first coil having a first phase and a second coil having a second phase at 90 degrees from said first phase of said first coil, said stator output coil section operative to output a signal corresponding to a rotation to be detected and appearing on said rotor;

said rotor coil including a rotor excitation coil and a rotor output coil that are both provided on said rotor iron core, said rotor excitation coil operative to receive said resolver excitation signal transmitted from said stator excitation coil section, said rotor output coil operative to generate an output signal to said stator output coil section such that said stator output coil can generate said signal corresponding to said rotation to be detected and appearing on said rotor;

said stator excitation coil section and said rotor excitation coil forming an excitation function block including a first number of pole pairs, said stator output coil section and said rotor output coil forming an output function block including a second number of pole pairs that is different from said first number of pole pairs such that said excitation function block and said output function block are operatively interrelated as a function of said first and second numbers of pole pairs.

11. A brush-less resolver according to claim 10, wherein said excitation function block generates excitation signals $E_1$ and $E_2$, where:

$$E_1 = E\sin\omega t; \text{ and,}$$
$$E_2 = E\cos\omega t;$$

such that when an associated AC voltage is applied to both of said first and second coils in said stator excitation coil section, said output function block generates output signals $E_5$ and $E_6$, where:

$$E_5 = KE\sin\{\omega t + (m+n)\theta\}; \text{ and,}$$
$$E_6 = KE\cos\{\omega t + (m+n)\theta\};$$

where K is a transformer ratio, E is an input signal, $\omega$ is an angular velocity, t is a time, m is said first number of pole pairs, n is said second number of pole pairs, and $\theta$ is a rotation angle.

12. A brush-less resolver according to claim 10, wherein said excitation function block generates excitation signals $E_1$ and $E_2$, where:

$$E_1 = E\sin\omega t; \text{ and,}$$
$$E_2 = E\cos\omega t;$$

such that when an associated AC voltage is applied to both of said first and second coils in said stator excitation coil section, said output function block generates output signals $E_5$ and $E_6$, where:

$$E_5 = KE\sin\{\omega t + (m-n)\theta\}; \text{ and,}$$
$$E_6 = KE\cos\{\omega t + (m-n)\theta\};$$

where K is a transformer ratio, E is an input signal, $\omega$ is an angular velocity, t is a time, m is said first number of pole pairs, n is said second number of pole pairs, and $\theta$ is a rotation angle.

13. A brush-less resolver according to claim 10, wherein said excitation function block generates excitation signal $E_1$, where:

$$E_1 = E\sin\omega t;$$

such that when an associated AC voltage is applied to said first coil in said stator excitation coil section, said output function block generates output signals $E_5$ and $E_6$, where:

$$E_5 = KE_1\cos\{(m+n)\theta\}; \text{ and,}$$
$$E_6 = KE_1\sin\{(m+n)\theta\};$$

where K is a transformer ratio, $E_1$ is an input signal, m is said first number of pole pairs, n is said second number of pole pairs, and $\theta$ is a rotation angle.

14. A brush-less resolver according to claim 10, wherein said excitation function block generates excitation signal $E_1$, where:

$$E_1 = E\sin\omega t;$$

such that when an associated AC voltage is applied to said first coil in said stator excitation coil section, said output function block generates output signals $E_5$ and $E_6$, where:

$$E_5 = KE_1\cos\{(m-n)\theta\}; \text{ and,}$$
$$E_6 = KE_1\sin\{(m-n)\theta\};$$

where K is a transformer ratio, $E_1$ is an input signal, m is said first number of pole pairs, n is said second number of pole pairs, and $\theta$ is a rotation angle.

15. A brush-less resolver according to claim 10, wherein said excitation function block generates excitation signals $E_1$ and $E_2$, where:

$$E_1 = E\sin\omega t; \text{ and,}$$

$$E_2 = E\cos\omega t;$$

such that when an associated AC voltage is applied to both of said first and second coils in said stator excitation coil section, said output function block generates output signal $E_5$, where:

$$E_5 = KE\sin\{\omega t + (m+n)\theta\};$$

where K is a transformer ratio, E is an input signal, $\omega$ is an angular velocity, t is a time, m is said first number of pole pairs, n is said second number of pole pairs, and $\theta$ is a rotation angle.

16. A brush-less resolver according to claim 10, wherein said excitation function block generates excitation signals $E_1$ and $E_2$, where:

$$E_1 = E\sin\omega t; \text{ and,}$$

$$E_2 = E\cos\omega t;$$

such that when an associated AC voltage is applied to both of said first and second coils in said stator excitation coil section, said output function block generates output signal $E_5$, where:

$$E_5 = KE\sin\{\omega t + (m-n)\theta\};$$

where K is a transformer ratio, E is an input signal, $\omega$ is an angular velocity, t is a time, m is said first number of pole pairs, n is said second number of pole pairs, and $\theta$ is a rotation angle.

17. A brush-less resolver according to claim 10, wherein said first number of pole pairs and said second number of pole pairs are each a positive integer and an arbitrary number.

18. A method of constructing a brush-less resolver that includes a stator and a rotor, said method comprising:
 a) providing a stator iron core;
 b) forming a stator coil on said stator iron core with said stator coil including a stator excitation coil section and a stator output coil section, said stator excitation coil section adapted to be excited by an associated AC voltage for transmitting a resolver excitation signal to said rotor, said stator excitation coil section including a plurality of coils with a first coil having a first phase and a second coil having a second phase at 90 degrees from said first phase of said first coil, said stator output coil section operative to output a signal corresponding to a rotation to be detected and appearing on said rotor;
 c) providing a rotor iron core;
 d) forming a rotor coil on said rotor iron core with said rotor coil including a rotor excitation coil and a rotor output coil;
 e) supporting said rotor iron and said rotor coil within said stator iron core and said stator coil such that said rotor excitation coil is operative to receive said resolver excitation signal transmitted from said stator excitation coil section and such that said rotor output coil is operative to transmit an output signal to said stator output coil section such that said stator output coil can generate said signal corresponding to said rotation to be detected and appearing on said rotor.

19. A method according to claim 18, wherein said action of supporting in e) includes forming an excitation function block from said stator excitation coil section and said rotor excitation coil that includes a first number of pole pairs and forming an output function block from said stator output coil section and said rotor output coil that includes a second number of pole pairs that is different from said first number of pole pairs.

* * * * *